Aug. 25, 1964     J. B. DICKSON     3,145,933
SHOCK ABSORBING MOUNTINGS FOR VEHICLE LAMP COMPONENTS
Filed March 16, 1961     5 Sheets-Sheet 1
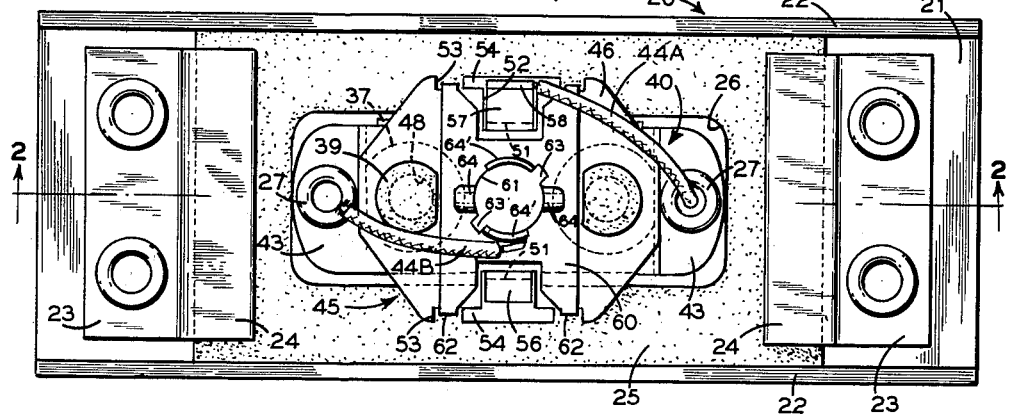
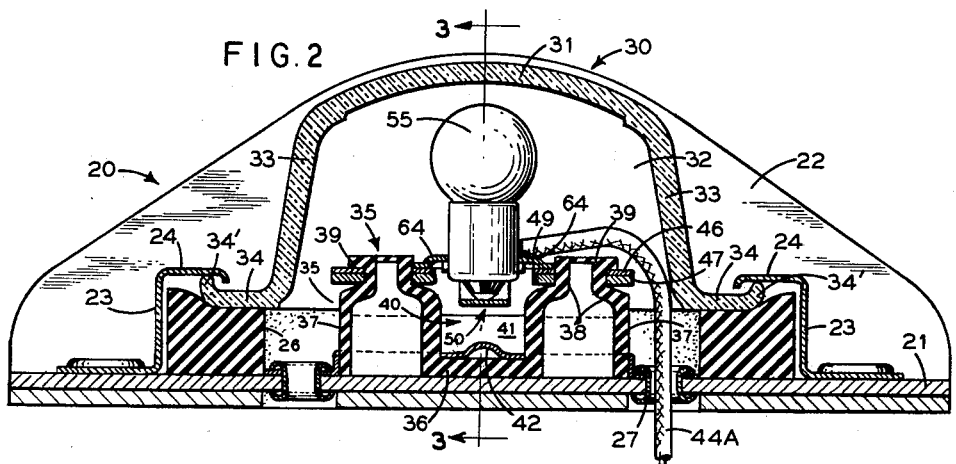
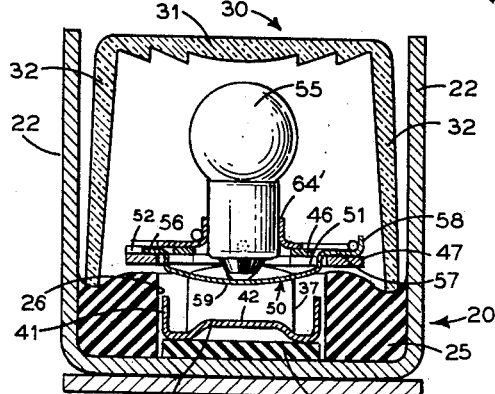
INVENTOR.
John B. Dickson
ATTORNEYS Aug. 25, 1964  J. B. DICKSON  3,145,933
SHOCK ABSORBING MOUNTINGS FOR VEHICLE LAMP COMPONENTS
Filed March 16, 1961  5 Sheets-Sheet 2

INVENTOR.
John B. Dickson
BY Blum, Moscovitz,
Friedman & Blum
ATTORNEYS

Aug. 25, 1964     J. B. DICKSON     3,145,933

SHOCK ABSORBING MOUNTINGS FOR VEHICLE LAMP COMPONENTS

Filed March 16, 1961     5 Sheets-Sheet 3

*INVENTOR.*
John B. Dickson
BY *Blum, Moscovitz,*
*Friedman & Blum*
ATTORNEYS

Aug. 25, 1964  J. B. DICKSON  3,145,933
SHOCK ABSORBING MOUNTINGS FOR VEHICLE LAMP COMPONENTS
Filed March 16, 1961  5 Sheets-Sheet 4

INVENTOR.
John B. Dickson
BY *Blum, Moscovitz,*
*Friedman & Blum*
ATTORNEYS

Aug. 25, 1964  J. B. DICKSON  3,145,933
SHOCK ABSORBING MOUNTINGS FOR VEHICLE LAMP COMPONENTS
Filed March 16, 1961  5 Sheets-Sheet 5

INVENTOR.
John B. Dickson
BY Blum, Moscovitz,
Friedman & Blum
ATTORNEYS

United States Patent Office 3,145,933
Patented Aug. 25, 1964

3,145,933
SHOCK ABSORBING MOUNTINGS FOR VEHICLE
LAMP COMPONENTS
John B. Dickson, Kew Gardens, N.Y., assignor to Signal-Stat Corporation, Brooklyn, N.Y., a corporation of New York
Filed Mar. 16, 1961, Ser. No. 96,181
4 Claims. (Cl. 240—8.2)

This invention relates to clearance and marker lamps for commercial automotive vehicles, such as buses and trucks, and more particularly to lamps of this type incorporating novel shock isolating means for the lamp bulb and its socket and novel means whereby lenses may be readily removed for access to the lamp bulb or bulbs.

Commercial automotive vehicles, such as buses, trucks, trailers and the like, are required by law or by Interstate Commerce Commission regulations, to carry or be provided with certain specified lamps of the clearance or marker type. Such lamps are designed to be mounted on the front and rear ends of the vehicle, and also on the sides of the vehicle.

As hitherto constructed, such lamps have had certain disadvantageous features. For example, due to the road shocks to which a commercial vehicle is continuously subjected, the filaments in the lamp bulbs have been broken at a relatively high rate. This necessitates that the lamp bulbs be replaced at frequent intervals, and very often this happens when the vehicle is on a run. Unless the driver has been supplied with certain special tools for removing lenses and the like, it is difficult, if not impossible, for him to replace a broken lamp bulb during a run.

In accordance with the present invention, novel lamp constructions are provided in which not only may the lenses be relatively easily removed for access to a lamp bulb or lamp bulbs in the lamp housing, but also novel shock absorbing means are interposed between each lamp bulb socket and a relatively fixed part of the housing so that the lamp bulb and its socket are isolated from road shocks received by the vehicle. Consequently, the life of lamp bulbs in lamps embodying the principles of the present invention is an indefinite multiple of the life of lamp bulbs in known types of marker and clearance lamps.

Stated as a general principle, the shock isolating mounts of the lamps of the present invention operate in a cantilever fashion. They are formed of relatively soft rubber elements, which have somewhat the configuration of nipples, with the base of the nipple being secured to the housing of the lamp and the support for the lamp bulb sockets being mounted on the upper ends of the nipples and spaced substantially from the base thereof. Due to the relatively soft nature of the rubber or rubber-like material used in making the shock mountings, this material has a resiliency and "give" which allows shocks to be absorbed without being transmitted to the lamp socket or the lamp therein.

For an understanding of the principles of the invention, reference is made to the following description of typical embodiments thereof as illustrated in the accompanying drawings. In the drawings:

FIG. 1 is a plan view, with the lens removed, of one form of clearance or marker lamp embodying the invention;

FIG. 2 is a longitudinal sectional view of this lamp, taken on the line 2—2 of FIG. 1;

FIG. 3 is a transverse sectional view of the lamp, taken on the line 3—3 of FIG. 2;

Figure 8:
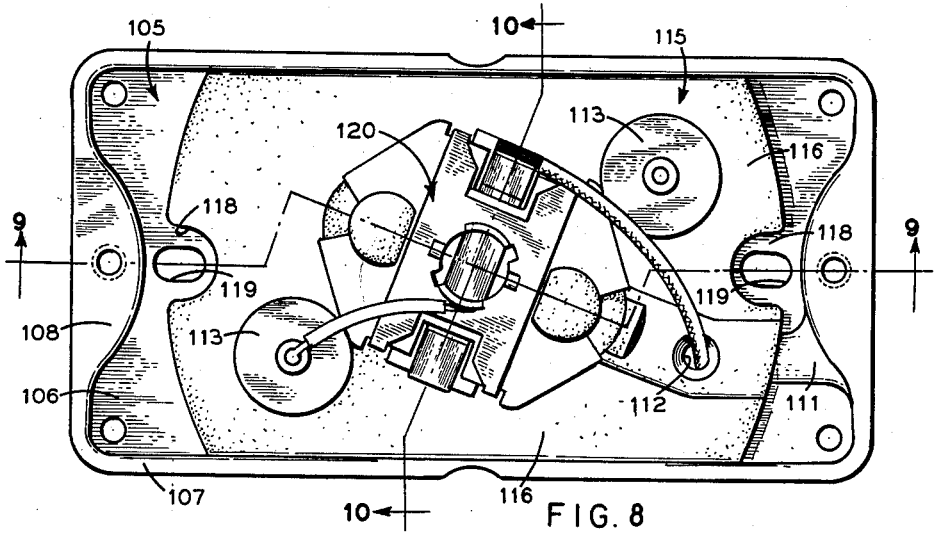
FIG. 8 is a plan view of a third form of marker or clearance lamp embodying the invention, the lens being removed.
Figure 9:
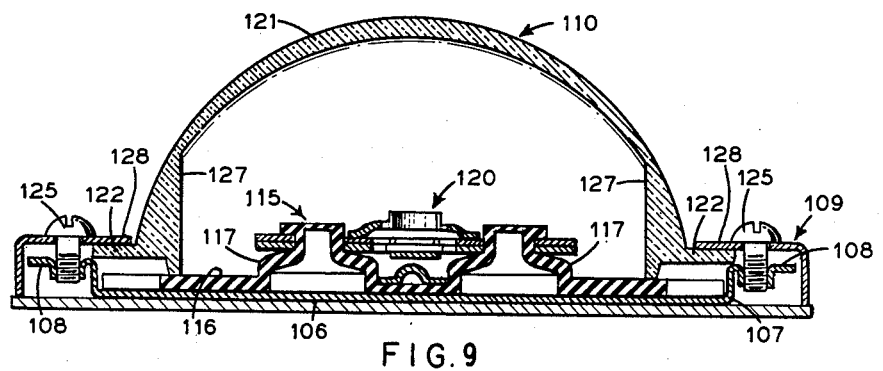
Figure 10:
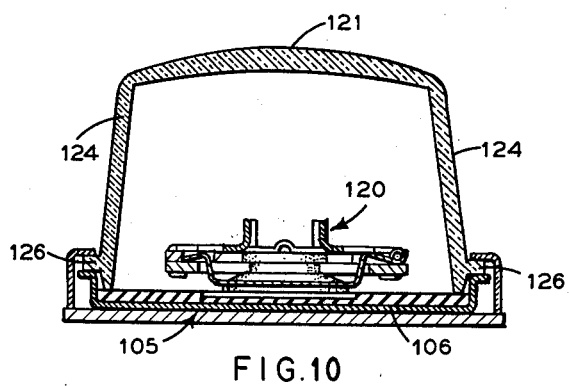
Figure 11:
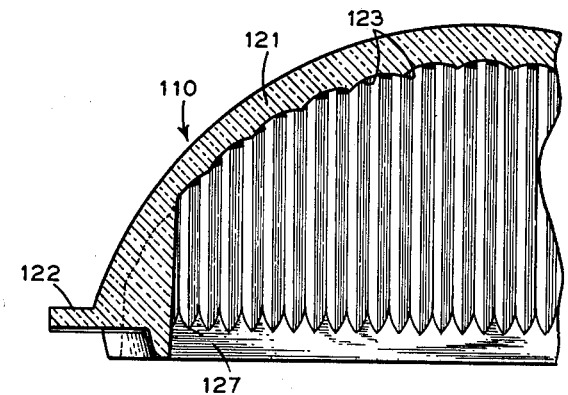
Figure 12:
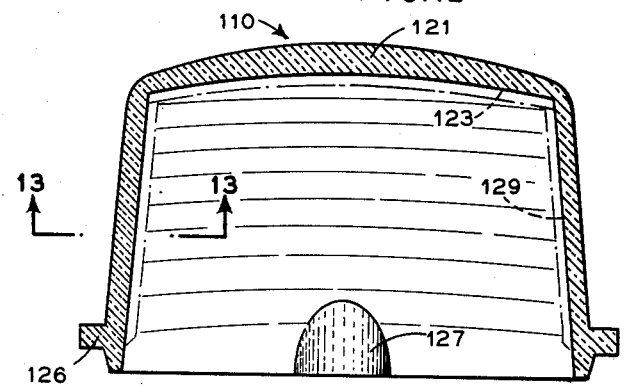
Figure 13:
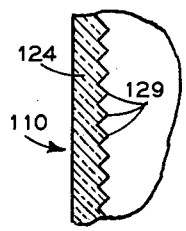
Figure 14:
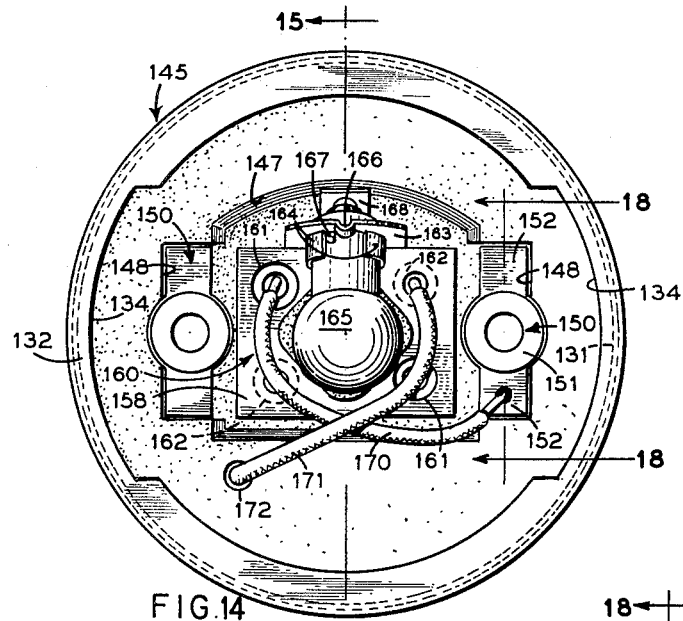
Figures 15, 16:
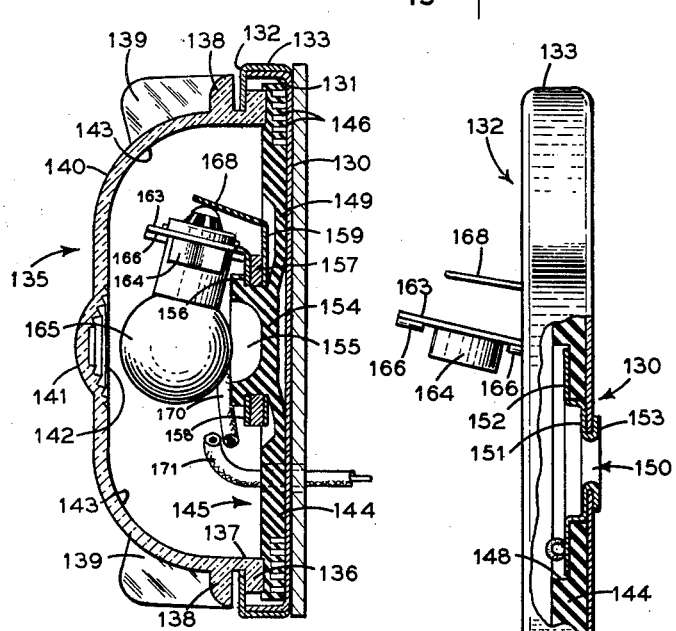
Figure 17:
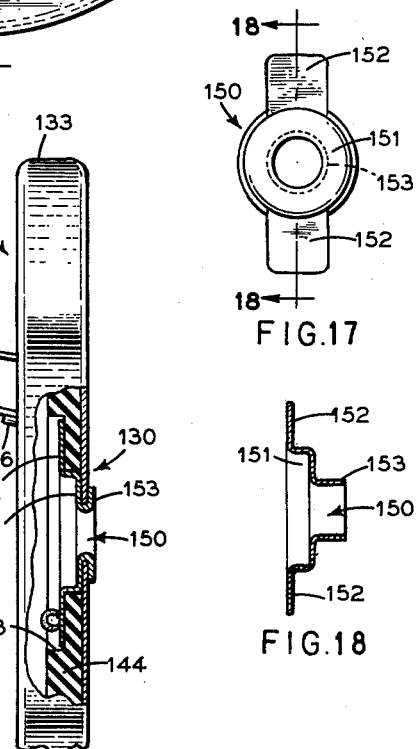

FIGS. 9 and 10 are sectional views taken on the lines 9—9 and 10—10, respectively, of FIG. 8;

FIG. 11 is an enlarged partial longitudinal sectional view of the lens of the lamp shown in FIG. 8, illustrating details of its construction;

FIG. 12 is a transverse sectional view through the lens;

FIG. 13 is a detailed partial sectional view of the lens illustrating a further detail of its construction;

FIG. 14 is a plan view, with the lens removed, of a fourth form of marker or clearance lamp embodying the invention;

FIG. 15 is a diametric sectional view of the lamp shown in FIG. 14, taken on the line 15—15 thereof;

FIG. 16 is an elevational view, partly in section, of the lamp shown in FIG. 14;

FIG. 17 is a plan view of a portion of the lamp shown in FIG. 14; and

Figure 18:
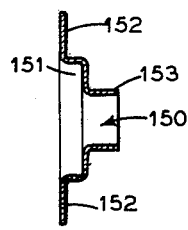

FIG. 18 is a sectional view taken on the line 18—18 of FIG. 17 and of FIG. 14.

Referring first to the embodiment of the invention illustrated in FIGS. 1, 2 and 3, the lamp shown therein includes a metal base 20 substantially rectangular in plan and having a bottom wall 21 and parallel arched side walls 22 which, in effect, form guards for the lamp. A pair of Z-shaped spring metal brackets 23 are riveted or otherwise secured to bottom wall 21 near each end thereof, and have upper lips 24 extending toward each other. A substantially rectangular block 25, of relatively soft rubber or the like, is seated on wall 21 and extends beneath the lips 24 of clamps 23. As best seen in FIGS. 1, 2 and 3, block 25 has a substantially rectangular central opening 26. It will be noted that the height of block 25, or its thickness, is only slightly less than the height of the clamps 23.

The block 25, in cooperation with the lips 24 of the brackets 23, serves to releasably retain in position the lens 30. This lens, which is molded of a suitable translucent or transparent plastic composition material, includes an arched outer wall 31, which has its outer surface somewhat inwardly of the curved peripheries of the walls 22 of base 20, inwardly diverging side walls 32, diverging end walls 33, and lips 34 at each end having upturned outer ends as indicated at 34'. Lens 30 is positioned by sliding one of the lips 34 beneath a flange 24, compressing the material of block 25, and then sliding this lip 34 further into the clamp 23 until the opposite lip 34 may be pushed down beneath the inner edge of lip 24 of clamp 23 and then slid underneath this lip with compression of the material of block 25. The lens is thus locked in position and may be easily released for access to the interior of the lamp by pressing the lens downwardly, sliding it toward one end of the base, releasing one lip, and then releasing the second lip. This makes for easy replacement of lamp bulbs in the lamp, or checking of connections, or other inspection, either in the shop or en route. The interior surfaces of top wall 31 and end walls 33 are configured to provide optical properties for the lens 30, but the side walls 32 are preferably plan and clear.

The shock isolating mounting is generally indicated at 35, and is formed of relatively soft rubber or rubber-like material. Shock mount 35 includes a substantially rectangular base 36 adjacent either end of which a pair of tubular bosses or nipples extend upwardly as indicated at 37. The upper ends of nipples 37 are reduced in diameter, as indicated at 38, to form a supporting shoulder, and incompletely circular flanges 39 project outwardly from the upper end of this reduced section 38.

Shock mount 35 is retained in position by a metal retainer 40 overlying the base portion 36 and having openings receiving the nipples or bosses 37. Retainer plate 40 has a pair of side flanges 41 and a reinforcing rib 42 extending centrally thereacross. The retainer also has projecting end lips 43 which are apertured to receive eyelet rivets 27 anchoring the retainer to the base 21 of the lamp base 20, bottom wall 21 of base 20 being suitably apertured to receive the rivets 27. It will be noted that the nipples or bosses 37 extend a substantial distance upwardly from the base of retainer 40. These nipples form a cushioning or shock isolating support for the socket assembly generally indicated at 45.

Socket assembly 45 includes upper and lower substantially hexagonal insulating plates 46 and 47 of suitable dielectric material. These plates are arranged to be superposed in substantially congruent relation, and have aligned circular apertures 48 arranged to have a close fit over the reduced portions 38 of nipples 37, and flanges 39 being squeezed through the apertures 48 by compression of the soft rubber and then overlying the upper surface of the upper insulating plate 46. Plates 46 and 47 are also provided with coaxial substantially circular and aligned central openings 49. Lower plate 47 has a pair of substantially rectangular slots 51 extending in diametrically opposite relation from opening 49, and upper plate 46 has a pair of diametrically opposite notches 52 aligned with the slots 51 and having their inner edges somewhat inwardly of the outer edges of the slots 51. Upper plate 46 also has shallow rectangular notches 53 on its opposite side edges and somewhat wider than the slots 52. The lower plate 47 has rectangular extensions 54 extending into the notches 53 and forming therewith pairs of relatively narrow notches for a purpose to be described.

The rectangular openings formed between the outer edges of slots 51 and the inner edges of notches 52 serve to receive the ends of a contact spring 50. Contact spring 50 is formed of suitable electrically conductive resilient material such as Phosphor bronze. Contact spring 50 extends transversely of the socket assembly and has an offset end 56 overlying the lower plate 47 and seated in a notch 52, and a second offset end 57 similarly disposed but having an upturned outer end 58. The intermediate portion of the contact spring 50 is slightly arched inwardly as indicated at 59.

The lamp socket 60 is preferably made of brass and is generally H-shaped in plan with a wide cross bar having a central aperture 61 coaxial and aligned with the apertures 49 of the insulator plates 46 and 47. The legs of the H have downturned ends 62 which are arranged to engage in the notches formed between the edges of recess 53 on the upper insulating plate and extension 54 of the lower insulating plate, and to be bent under to form a unitary assembly of the two plates 46 and 47 and the socket 60. It will be noted that the edges of the "cross bar" of the socket are substantially inwardly of the inner edges of the notches in the upper insulating plate 46. This provides a clearance between the socket 60 and the contact strip 50, whereby the two are effectively electrically isolated from each other.

Socket 60 is formed with a pair of radial notches 63 on a diagonal diameter of opening 60 and, on a longitudinal diameter of this opening, the socket is formed with a pair of radially extending outwardly offset recesses 64. Extending counterclockwise from each notch 63, as viewed in FIG. 1, there are a pair of arcuate flanges 64'. The lamp bulb 55 is inserted into the socket 60 with the usual radial pins aligned with the notches 63, and the lamp bulb is then turned clockwise until its pins seat in the recesses 64. The center contact of the lamp bulb base engages the contact strip 50, which tends to bias the lamp out of the socket and serves to maintain the base pins firmly engaged in the recesses 64. A first conductor 44a is brazed or soldered to the lip 58 of contact strip 50 and is brought out through one of the eyelets 27. A second insulated conductor 44b is brazed or soldered to the arcuate lip 64' nearer the opposite end of strip 50, and conductor 44b is brazed or soldered to the other eyelet 27. The conductor 44a is used to connect the lamp in a suitable lamp control circuit.

During driving of the vehicle on which the lamp is mounted, the entire socket assembly 45 rests on top of the nipples 37 and thus has a cushion support whereby shocks received by the vehicle and transmitted to the base 20 are not at all effective on the socket assembly. The shock-mount 35 completely isolates the lamp bulb 55, as well as the entire socket assembly 45, from transmission of road shocks thereto. Thereby, the lamp bulb 55 has a life which is a large multiple of the life of similar lamp bulb when mounted in lamps not provided with the shock isolating means of the present invention.

Referring to the embodiment of the invention illustrated in FIGS. 4 through 7, the lamp therein illustrated has a shock isolating mounting for the socket assembly which is essentially similar, in principle, to that of the lamp of FIGS. 1, 2, and 3. The lamp shown in FIG. 4 through 7 is arranged to have two lamp bulbs mounted therein but connected in a common energizing circuit.

The lamp includes a base 65 which is substantially oval in plan and has a peripheral wall 66 which is relatively thick laterally but hollowed out to reduce weight. The upper portion of rim 66 has an outwardly and upwardly opening substantially arcuate recess 67 extending therearound and, near the upper edge of rim 66, a substantially rectangular groove 68 extends inwardly from arcuate recess 67. Recess 68 receives a gasket 69 of suitable flexible and resilient material and which has a circular cross section. Gasket 69 extends somewhat outwardly of recess 68 to project slightly beyond the surface of arcuate recess 67.

Figure 4:
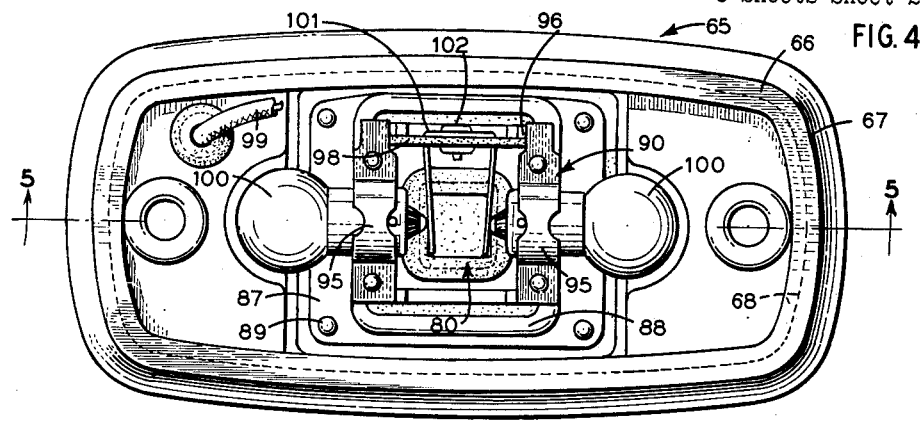
FIG. 4 is a plan view, with the lens removed, of another form of clearance or marker lamp embodying the invention.
Figure 5:
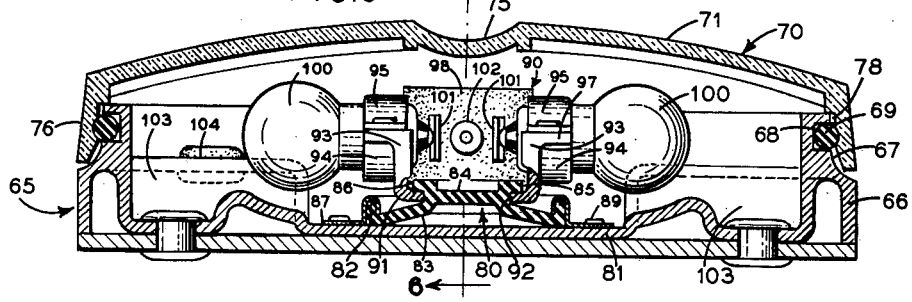
FIG. 5 is a sectional view on the line 5—5 of FIG. 4.
Figure 7:
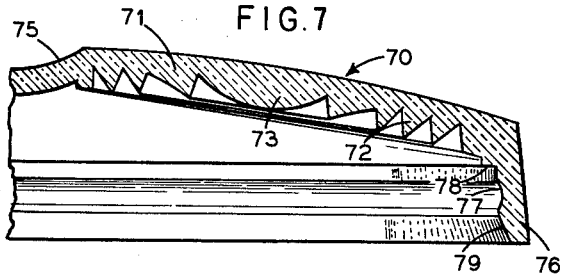
FIG. 7 is an enlarged partial sectional view through the lens, illustrating details of its refracting surfaces.
Figure 6:
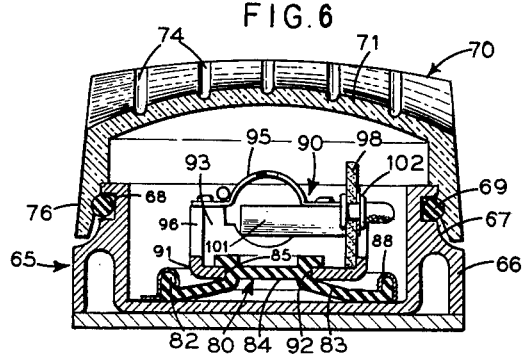
FIG. 6 is a sectional view taken on the line 6—6 of FIG. 5.

Gasket 69 serves as a retainer for a lens 70 for the lamp. This lens 70, which is molded from a suitable transparent or translucent plastic composition material of any desired color, includes a generally arched outer wall 71 having its inner surface formed, as best seen in FIG. 7, with suitable ribs 72, substantially saw toothed in form, and ribs 73 substantially arcuate in form serving to impart the desired optical properties to lens 70. Wall 71 also has an arcuate depression 75 extending transversely thereof intermediate its ends, and the outer surface of wall 71 has grooves 74 extending longitudinally from the recess 75 to each end of the lens.

Lens 70 has a side wall or rim 76 extending downwardly from wall 71 and forming a peripheral wall of the lens. Wall 76 slopes somewhat outwardly and has a substantially flat outer surface. The inner surface of wall 76 is formed with a shallow arcuate recess 77 outwardly of which is a shoulder 78. Inwardly of recess 77, the inner surface of wall 76 slopes outwardly at a relatively sharp angle as indicated at 79. Lens 70 is assembled by forcing it downwardly over the wall 66 until the gasket 69 engages in the recess 77, at which point the shoulder 78 will be substantially at the upper surface of rim 66 of base 65. The sloping surface 79 provides appropriate clearance with the arcuate surface 67.

The bottom wall 81 of base 75 has a substantially flat central portion on which is mounted the shock isolating assembly generally indicated at 80. This shock isolating member is a generally flat piece of soft rubber which is rectangular in plan and has an upturned peripheral rim 82. Inwardly of rim 82, the base of shock mount 80 slopes upwardly as indicated at 83 with the inner edges of the upwardly sloping portion 83 merging with a boss or nipple 85 having a substantially horizontal inner surface or membrane 84. Nipple 85 has an outturned flange 86 at its upper end.

Shock mount 80 is retained in position by a retainer plate 87 having a central opening receiving the mounting and provided with an inturned rib 88 extending over the shoulder or rim 82 of the shock mount. Rivets 89 secure metal retaining plate 87 to the base wall 81.

A dual socket assembly is generally indicated at 90 and comprises a metal socket member which is generally U-shaped in elevation and includes a base 91 having a central square opening 92 arranged to closely fit the nipple 85 of shock mount 80. Shock mount 80 is engaged in this central opening 92 by means of the flange 86 being pressed inwardly until it snaps through the opening and engages thereover with the base 91 resting on the upper edges of the sloping portions 83 of shock mounting 80. End walls 93 extend from either longitudinally opposite end of member 91 and have arcuate semicylindrical recesses in their upper edges continued as semicylindrical extensions 94 each forming one half of a lamp socket. End walls 93 have inturned flanges 96 at each end, and horizontal flanges 97 extend outwardly from either side of the half sockets 94. Mating half socket elements 95, 95 are riveted to the flanges 97 to complete the pair of lamp sockets arranged to receive the bases of bayonet type lamp bulbs 100.

One pair of inturned ends 96 of the end walls 93 serves to position a dielectric or insulating plate 98 having a pair of spaced slots through which extend the elongated arms of a U-shaped contact member 101, of Phosphor bronze or the like, having its base riveted to plate 98 by an eyelet type rivet 102. The arms of contact 101 are engaged by the base contacts of lamps 100.

Adjacent its outer end, base 65 has elevated portions 103 which define arcuate recesses having peripheral surface portions spaced slightly from the bulbs 100, and one of these raised portions 103 is apertured to receive a grommet 104 through which extends an insulated conductor 99 arranged to have its end bared and soldered or brazed to one of the straps 95 to form one terminal of the lamp circuit. A similar insulated conductor (not shown) has an end bared and soldered or brazed to the contact strip 101. Alternatively, conductor 99 may be connected to contact strip 101 and a short conductor may be soldered or brazed to a strap 95 and to base 65, the short conductor providing a grounding connection for the lamps.

It will be noted that the entire socket assembly is cushioned by the shock mount 80 and thereby isolated from any transmission of road shocks thereto, thus resulting in a greatly increased life of the lamp bulbs 100.

Referring to FIGS. 8 through 13, the lamp therein illustrated includes a metal base 105 which is relatively shallow, having a flat bottom wall 106 and a peripheral rim 107 which is widened arcuately at each end of the base. The arcuate portions 108 have threaded apertures which are axially lengthened to receive fastening screws for a retainer 109 for the lens 110. Bottom wall 106 of base 105 has an inwardly offset dog-leg groove 111 opening outwardly through the rim 107 and having an aperture at its end aligned with an aperture 112 in the base 116 of a shock isolating mounting 115.

The shock mount 115 is essentially similar to the shock mount 35 of FIGS. 1, 2 and 3 except that its upwardly projecting nipples or bosses 117 are much shallower than the similar elements 37 of the shock mount 35. The base 116 of the shock mount is essentially rectangular in plan having arcuate ends, and is secured to the bottom wall 106 of metal base 105 by means of washer-type rivets 113.

The socket assembly, indicated at 120, is identical with the socket assembly 45 of FIGS. 1, 2, and 3, so that further description thereof is not believed necessary.

Each end of base 116 has a recess 118 aligned with an oval opening 119 in the bottom wall 106 of metal base 105. Lens 110, which is molded of a suitable transparent or translucent plastic composition material has a substantially cylindrical outer wall 121 the lower ends of which terminate in flanges 122. Wall 121 is cylindrical about an axis extending transversely of the lamp, and its inner surface is formed with a plurality of transversely extending arcuate grooves 123. Side walls 124 slope downwardly and inwardly from the outer wall 121, and are formed with horizontal ledges 126, the side walls extending below this ledge. Adjacent either end of top wall 121, the latter is thickened so that its inner surface is substantially vertical, as indicated at 127, and this portion of the top wall extends below the ledges 122 to terminate in a common plane with the lower edges of side walls 124.

When lens 110 is placed on the lamp base, the lower edges of its side and end walls engage the flat base 116 of the shock mount 120, which latter is made of soft rubber and thus also acts as a sealing gasket. The lens retainer 109 is then placed in position, and is an annular member having a central opening closely embracing the lens 110. This annular opening is bounded by an inwardly extending flange which overlies the ledges 122 and 126. Retainer 109 is secured in position by screws 125 extended through apertures in its flange 128 and threaded into the apertures in flanges 108. The side walls 124 of the lens are formed with vertically extending closely spaced triangular ribs 129.

It will be noted that, in this lamp, as in the one shown in FIGS. 1, 2 and 3, the socket assembly 120 is resiliently supported by the shock isolating assembly 115 so that no road shocks are transmitted to a lamp bulb mounted in the socket assembly. Also, the lens 110 can be easily removed by simply drawing out the screws 125, taking off the retainer 109, and then removing the lens 110.

In the embodiment of the invention shown in FIGS. 14 through 18, the lamp includes a housing comprising a substantially circular base 130 having an upstanding peripheral flange 131 and a mating circular retainer 132 having a peripheral flange 133 overlapping and tightly engaging the flange 131. Flange 133 has a pair of diametrically opposite cutouts or notches 134 of substantial arcuate extent.

The cutouts 134 are arranged to receive lips 136 on the cylindrical wall 137 of a lens 135. At a level spaced outwardly from the lips 136, lens 135 is formed with a flange extending completely therearound and overlying the flange 132 of the retainer. The lens 135 is placed in position by moving the lips 136 into the cutouts 134 and then turning the lens until the lips 136 engage beneath the retainer 132. Such turning is facilitated by a pair of diametrically opposite radial wings 139 extending from the lens 135 and merging with the peripheral flange 138.

The main concavo-convex outer portion 140 of lens 135 is provided with a "bull's eye" 141 whose inner surface has a series of concentric grooves 142 extending parallel to the wings 139. Inwardly of the "bull's eye," the surface of portion 140 is formed with a plurality of radial ribs 143.

In this modification of the invention, the shock isolating mounting, generally indicated at 145, includes a circular disc 144 having a diameter just slightly less than the inner diameter of flange 131 of base 130, and formed of soft rubber. Adjacent the periphery of disc 144, its inner surface is formed with a plurality of grooves 146 extending circumferentially thereof and radially spaced slightly therefrom to provide a plurality of relatively thin ribs 146. This increases the yieldability of disc 144 at the portion engaged by the ears 136 of lens 135, the disc 144 acting as a sealing gasket for the lens and forcing the ears 136 outwardly against retainer 132. The central portion of the upper surfaces of disc 144 is recessed to thin the material of the disc, as indicated at 147, this recess having one straight edge opposite an arcuate edge, and having two extension recesses 148. These extension recesses receive anchoring members 150 (FIGS. 17 and 18) each comprising a recessed annular central part 151 and a pair of diametrically extending ears 152. These central parts 151 are in the nature of eyelets and are axially extended to fit through openings in base 130, being turned over underneath the base, as indicated at 153. Thereby, there are formed eyelet rivet arrangements securing the shock mounting 145 to the base 130 and arranged to receive bolts or screws for securing the lamp to the surface of a vehicle.

Centrally of the recess 147, the thin portion 149 of disc 144 is offset upwardly away from the base 130, as indicated at 154. A nipple 155 extends upwardly from part 154 and has an outturned flange 156 on its outer end. Nipple 155 resiliently supports the socket assembly indicated generally at 160.

The socket assembly 160 includes a substantially square insulating plate 157 of dielectric material, an essentially square socket plate 158, and an essentially square contact plate 159. Socket plate 158 has a pair of diagonally opposite relatively large apertures 161 therein, and contact plate 159 has a pair of diagonally opposite relatively large apertures 162 therein, the apertures 161 and 162 alternating around the square formation of the socket assembly. Socket plate 158 is riveted to insulator plate 157 by relatively small eyelet rivets coaxially of the apertures 162 in contact plate 159. Similarly, contact plate 159 is riveted to insulator plate 157 by relatively small eyelet rivets arranged coaxially of the apertures 161. Thereby the socket plate 158 and the contact plate 159 are effectively electrically isolated from each other.

Socket plate 158 has an extension 163 bent upwardly at an angle from one edge thereof and formed with a circular aperture for receiving the base of a bayonet type lamp bulb 165. A pair of diametrically opposite arcuate wings 164 extend outwardly from extension 163, peripherally bounding the opening in the extension 163. Intermediate the wings 164, extension 163 is formed with a pair of diametrically opposite offsets 166, and between each offset 166 and an adjacent wing 164, the periphery of the opening is formed with a short notch 167. Contact plate 159 is formed with an extension arm 168 extending upwardly and outwardly in somewhat spaced relation to the extension 163 of socket plate 158. Thereby lamp bulb 165 may be inserted by having its pins extended through the notches 167, and then be turned until the pins engage in the offsets 166. At this time, the center contact of the lamp bulb will engage the spring extension 168 so that the lamp bulb will be retained mounted in the socket assembly.

The socket asembly is supported on the nipple 155 by engaging the same over the nipple until the flange 156 overlies plate 158 with plate 159 engaging the sloping portion of thin part 149 of disc 144. A short insulated conductor 170 has one bared end soldered to one clamp 150 and the other bared end soldered to a rivet securing contact plate 159 to insulator plate 157. Thus, contact plate 159 is effectively grounded. A second insulated conductor 171 has one bare end soldered to a rivet securing socket plate 158 to insulator plate 157. Conductor 171 extends through an opening 172 in disc 144 of shock mounting 145, this opening being aligned with a corresponding opening in base 130 so that the conductor 171 may be led to a suitable energizing circuit for the lamp.

It will be noted that the socket assembly 160 is supported in spaced relation to the base 130 by means of the shock isolating mounting 145, and particularly the nipple 155. Consequently, any road shocks received by the vehicle are effectively isolated from the socket assembly so that the lamp 165 has a life many times that of a lamp bulb not similarly mounted.

While specific embodiments of the invention have been shown and described in detail to illustrate the application of the principles of the invention, it will be understood that the invention may be embodied otherwise without departing from such principles.

What is claimed is:
1. An automotive vehicle lamp comprising, in combination, a housing including a base having a substantially flat upper surface portion; a one-piece shock isolating mounting of relatively soft and flexible rubber-like material including a laterally extending substantially flat base portion of substantial lateral extent overlying and engaging said flat upper surface portion, and at least one hollow nipple integral with end extending upwardly from said base portion in a direction substantially normal thereto and having upwardly and inwardly converging side walls; a lamp socket member formed with an aperture receiving the upper end of said nipple and supported solely by engagement with said converging side walls; whereby said lamp socket member is resiliently supported by said nipple and isolated thereby from shocks received by said base; a lens enclosing said lamp socket member and having a rim engaging said substantially flat base portion of said socket isolating mounting; and retaining means engaging said lens adjacent said rim and holding said lens in compressing relation with said substantially flat base portion and assembled to said lamp base; said substantially flat base portion of said shock isolating mounting acting as a sealing gasket for said lens; said housing base being relatively elongated; said retaining means comprising a pair of Z-shaped elements extending laterally across said base adjacent opposite ends thereof, and having upper flanges extending toward each other and over the substantially flat base portion of said shock isolating mounting, said upper flanges being spaced somewhat from the upper surface of said substantially flat base portion of said shock isolating mounting; said lens being relatively elongated and including a pair of laterally extending lips adjacent its rim, one at each end of said lens, and an upwardly and outwardly extending hollow housing portion intermediate said lips; the distance between the inner ends of said upper flanges of said pair of retaining elements being slightly greater than the length of said hollow housing portion adjacent said lip plus the width of one lip; whereby said lens may be assembled with said lamp base by engaging one lip thereof under one of said upper flanges and sliding said lip outwardly until the other lip clears the inner edge of the other flange so that it may be engaged beneath the latter, the lens being then moved in the reverse direction to engage the other lip beneath the other flange to center the lens relative to said retaining means.

2. An automotive vehicle lamp comprising, in combination, a housing including a base having a substantially flat surface portion; a shock isolating mounting of relatively soft and flexible rubber-like material including a laterally extending base portion engaging said base surface portion, and at least one hollow nipple extending upwardly from said base portion and having upwardly and inwardly converging side walls; a lamp socket member formed with an aperture receiving the upper end of said nipple and supported solely by engagement with said sloping side walls; whereby said lamp socket member is resiliently supported by said nipple and isolated thereby from shocks received by said base; a lens enclosing said lamp socket member and having a rim engaging the substantially flat base portion of said shock isolating mounting; and retaining means engaging said lens adjacent said rim and holding said lens in compressing relation with said substantially flat base portion and assembled to said lamp base; said substantially flat base portion of said shock isolating mounting acting as a sealing gasket for said lens; said retaining means comprising a pair of Z-shaped elements extending laterally across said base adjacent opposite ends thereof, and having upper flanges extending toward each other and over the substantially flat base portion of said shock isolating mounting, said upper flanges being spaced somewhat from the upper surface of said substantially flat base portion of said shock isolating mounting; said lens being relatively elongated and including a pair of laterally extending lips adjacent its rim, one at each end of said lens, and an upwardly and outwardly extending hollow housing portion intermediate said lips; the distance between the inner ends of said upper flanges of said pair of retaining elements being slightly greater than the length of said hollow housing portion adjacent said lip plus the width of one lip; whereby said lens may be assembled with said base by engaging one lip thereof under one of said upper flanges and sliding said lip outwardly until the other lip clears the inner edge of the other flange so that it may be engaged beneath the latter, the lens being then moved in the reverse direction to engage the other lip beneath the other flange to center the lens relative to said retaining means; each of said upper flanges having a downturned inner end and each of said lips having an outturned upper end, whereby said lens is locked in position against removal except when said lens is pressed inwardly and then slid longitudinally of said base so that said lips will clear each other.

3. An automotive vehicle lamp comprising; in combination, a housing including a base having a substantially flat surface portion; a shock isolating mounting of relatively soft flexible rubber-like material including a laterally extending base portion engaging said base surface portion, at least one hollow nipple extending upwardly from said base portion and having upwardly and inwardly converging side walls, a reduced neck extending from the upper end of said side walls, and a lateral retaining lip at the upper end of said neck; a lamp socket member formed with an aperture receiving said neck and fitted thereover by deformation of said lip, and supported solely by engagement with said sloping side walls; whereby said lamp socket member is resiliently supported by said nipple and isolated thereby from shocks received by said base; and in which said lamp socket member has a plate portion formed with said aperture and comprising an inner plate of dielectric material, an intermediate plate of dielectric material, and an outer plate of electrically conductive metal secured together as a unit; said outer plate having a bayonet type lamp bulb base receiving opening extending therethrough, and said inner and intermediate dielectric plates having openings therethrough aligned with said first mentioned opening and substantially larger in cross sectional area whereby to clear the base of a lamp bulb inserted through the opening in said electrically conductive plate; and a strip of resilient electrically conductive metal extending across said aligned apertures openings beneath said inner dielectric plate and having ends engaged with the latter; the base of a lamp inserted into said outer electrically conductive metal plate having its central contact pressure engaged with said conductive strip.

4. An automotive vehicle lamp comprising, in combination, a housing including a base having a substantially flat surface portion and being relatively elongated; a pair of lens retaining members secured to said base adjacent each end thereof and each comprising a Z-shaped element having a lower flange anchored to said base and upper flanges extending toward each other; compressible resilient material disposed between each of the flanges and said base and having an upper surface spaced slightly from the inner surface of the upper flange; a relatively elongated lens having a pair of laterally extending lips, each at one end thereof and arranged to engage beneath the associated one of said upper flanges; said lens lips being engaged beneath said upper flanges by compression of said resilient material and sliding of the lens lip underneath the upper flange; said lens having an upwardly and outwardly extending hollow housing portion between said lips, and the length of said housing portion plus the length of one lip of said lens being slightly less than the longitudinal distance between the inner edges of said upper flanges; whereby said lens may be engaged with said base by slipping one lip thereof underneath one of said upper flanges and sliding the lens outwardly toward the associated end of the base until the other lip of the lens clears the inner edge of the other upper flange, whereby the other lip may be engaged beneath the associated upper flange by pressing inwardly on the lens and moving the latter in the opposite direction.

References Cited in the file of this patent

UNITED STATES PATENTS

| | | |
|---|---|---|
| 2,037,033 | Lord | Apr. 14, 1936 |
| 2,685,639 | Wiley | Aug. 3, 1954 |
| 2,686,868 | Diedring | Aug. 17, 1954 |
| 2,700,726 | Bassler | Jan. 25, 1955 |
| 2,730,611 | Black | Jan. 10, 1956 |
| 2,781,443 | Cargle | Feb. 12, 1957 |
| 2,782,298 | Schulz et al. | Feb. 19, 1957 |
| 2,922,875 | Buck | Jan. 26, 1960 |